Aug. 11, 1936.　　　F. G. SANDERS　　　2,050,735
ELECTRIC MOTOR COMMUTATOR CLEANER
Filed Feb. 19, 1936
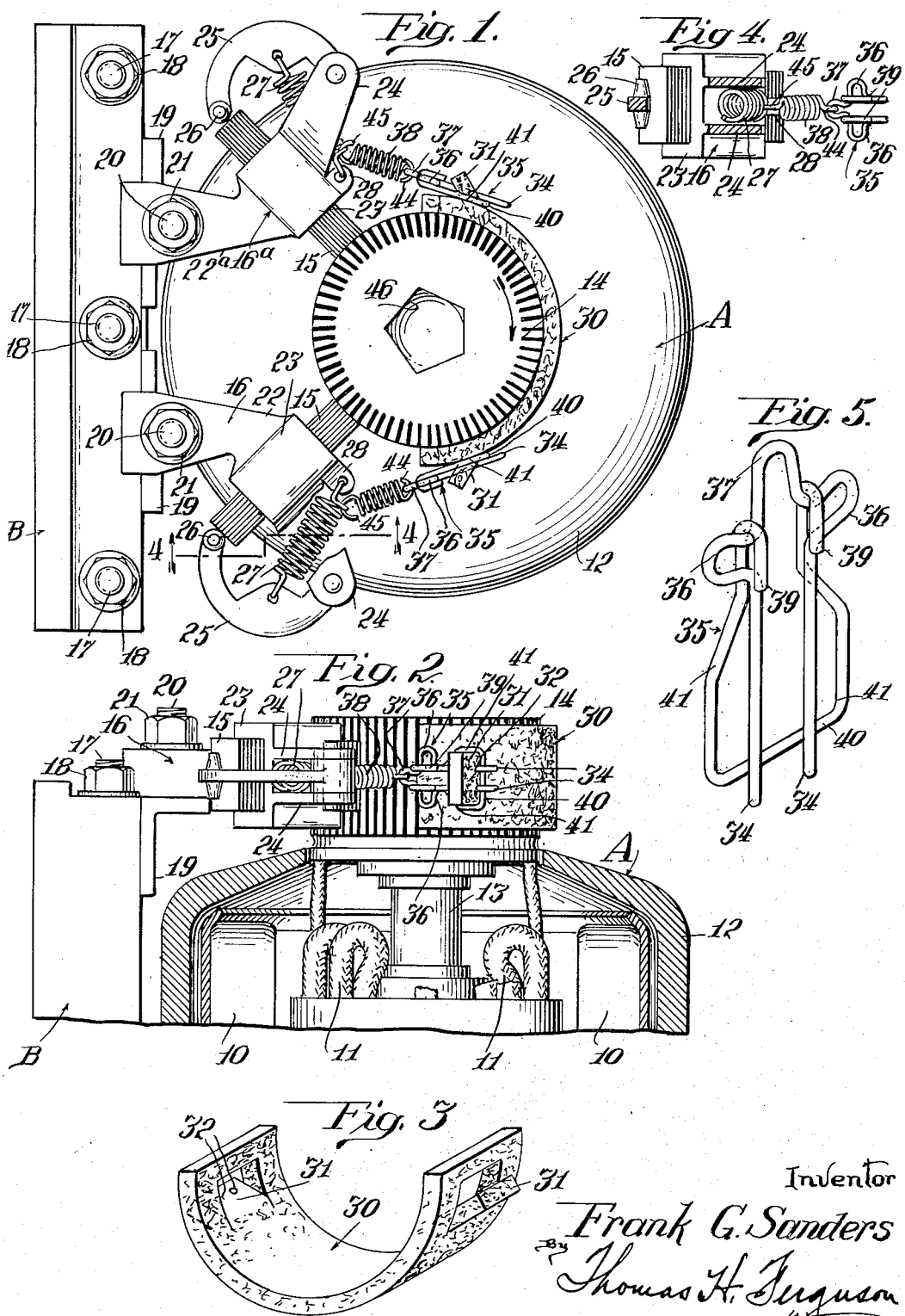
Inventor
Frank G. Sanders
By Thomas H. Ferguson
Attorney Patented Aug. 11, 1936

2,050,735

UNITED STATES PATENT OFFICE 2,050,735

ELECTRIC MOTOR COMMUTATOR CLEANER

Frank G. Sanders, Chicago, Ill., assignor to Russell B. Arnold, Chicago, Ill.

Application February 19, 1936, Serial No. 64,730

4 Claims. (Cl. 171—321)

The present invention relates to electric motor commutator cleaners and the main object of the invention is to provide a cleaner of this type which is economical to manufacture, highly efficient in operation, and suitable for reversible motors as well as for those having unidirectional rotation. Other objects are to produce a cleaner which in service will be in proper position at all times with its cleaning element held tight against the commutator surface and properly centered upon it. Another object is to produce the new device with a minimum of parts and to so arrange them that they may be readily positioned upon the motor by attachment to the brush holder and likewise easily removed and replaced for purposes of cleaning and repair.

The various objects and advantages of the invention will be best understood upon reference to the following detailed description taken in connection with the accompanying drawing wherein a preferred embodiment of the invention is disclosed. For an exact measure of the invention, reference should be had to the appended claims.

In said drawing, Fig. 1 is a plan view of a vertical electrical motor provided with a commutator cleaner constructed and arranged in accordance with the present invention; Fig. 2 is a side elevation illustrating particularly the cleaner and the associated parts and showing a portion of the electric motor in sectional elevation; Fig. 3 is a perspective view of the strap of flexible resilient material which forms an element of the cleaner; Fig. 4 is a detailed view illustrating the connection of certain parts in centered relation, other parts being shown in section, the plane of section being indicated by the line 4—4 of Fig. 1; and Fig. 5 is a perspective view of one of the buckles used in the device. Throughout these views like characters refer to like parts.

In the operation of electric motors having commutators it is important to keep the commutators clean. This is especially the case with reversible motors such as are used for the operation of railway switches. These particular motors are especially exposed to accumulations of dust, frost, congealed oil and other foreign matter which accumulate upon the periphery of the commutator at different seasons of the year and under different conditions of service. Where the motors are reversible these accumulations are often carried back and forth by the brushes as the motor reverses its direction of rotation. By the use of a cleaner constructed and arranged in accordance with the present invention the surface of the commutator is kept clean.

Referring to the drawing in particular, A designates a typical switch motor mounted with its axis vertical and associated with a suitable frame B. In this motor there are the usual field windings 10, armature windings 11, outer casing 12, armature shaft 13, commutator 14, brushes 15, and brush holders 16 and 16a. These motor parts are well known and need not be further described. Indeed, the motor may take many different forms. In the present instance the frame B of which part only is shown, is held in place by suitable bolts 17 provided with nuts 18. The brush holders 16 and 16a are connected to this frame through suitable angle brackets 19, bolts 20 and nuts 21 being employed for the purpose. The manner of supporting the brush holders is typical and may be varied according to circumstances.

In the present instance, the two brush holders 16 and 16a are practically identical, except that they are reversed, the one being, so to speak, a right hand holder and the other a left hand holder. The main arms 22 and 22a of the holders 16 and 16a, respectively, are provided with tubular portions 23 which constitute the holders proper. Beyond each portion 23 are also outwardly extending arms 24. Through the tubular holders 23, the brushes 15 extend. The outer end of each pair of arms 24 carries a curved lever 25 which is pivoted to the outer ends of the arms 24 and provided at its free end with a head 26. The latter is in position to engage the outer end of the associated brush 15. The position of the brush is radial and the action of the head 26 under its spring 27 is to force the brush longitudinally of itself toward the center of rotation of the commutator. As clearly shown, one end of each spring 27 is connected to the associated lever 25 at an intermediate point and the opposite end of the spring is connected to an apertured lug 28 upon the brush-holding portion 23 of the holder.

An important element of the cleaner is the strap 30. This element is flexible and resilient. It is wrapped about a considerable portion of the commutator periphery and has a width closely approaching the width of the commutator. It is this material that wipes off the accumulations upon the surfaces of the commutator. For ordinary purposes a substantial felt strap will answer the purpose. Obviously, the length of the strap may be varied. In the present instance it is wrapped about slightly more than one-half of the commutator surface. As the parts are viewed in Fig. 1, the strap 30 is provided near its ends with tongues 31. These in turn are apertured at 32 for the passage of prongs 34 of the buckle 35. The tongues 31 are easily provided by cutting through the strap in the manner particularly illustrated in Fig. 3. As here shown three sides of a square or oblong are cut through and the fourth side is left intact as a sort of hinge for the tongue. The tongues 31 extend outward from the commutator and are in position to be properly engaged by the associated buckles 35.

As clearly shown, particularly in Fig. 5, each buckle 35 comprises a pin member and a loop member. The pin member includes the prongs 34, previously mentioned, and three short loops which form a sort of head. Of these three loops, there are two side loops 36 and a central loop 37. The central loop 37 constitutes a central bearing for the spring 38 to which the buckle is attached when the parts are assembled. The side loops 36 in turn serve as bearings for hooks 39 of the loop member of the buckle. The center of the bearing loop 37 lies directly in the longitudinal axis of the buckle and so serves to center the buckle with reference to the pulling spring 38.

The loop member of the buckle comprises a loop having a transverse end 40 and side members 41 which terminate in the hooks 39, previously mentioned. As clearly shown, the latter are slipped over the side loops 36 and cooperate with the same as bearing members. As before noted, the spring 38 applies a pull to the buckle by acting through the central loop 37. On the other hand, the strap 30 pulls upon the other end of the buckle by engaging the transverse member 40. And one buckle member resists the other through the bearings provided by the side loops 36 and the hooks 39. The member 40 by engagement with the tongue 31 throughout its entire width and along a line at right angles to the longitudinal axis of the buckle keeps the buckle and strap properly centered.

It may be pointed out that in assembling the parts the loop member is first slipped over the tongue and its transverse portion 40 is brought up against the under face of the tongue near its point of attachment to the strap. Then the pin member is pushed into position by extending its prongs 34 through the openings 32 in the tongue. Following this the pin member is drawn out until the side loops 36 are seated in the hooks 39. When this position is reached the parts are ready to have the spring 38 connected.

When both buckles are assembled and connected to the ends of the strap 30 and both springs 38 are connected to the buckles, it will be noted that all the connected parts forming the cleaner are properly centered with reference to the commutator. The hooks 44 at one end of the springs 38 are simple half turns located axially of the spring coil and the same is true of the hooks 45 located at the other end of these springs. The former engage the centers of the buckle loops 37 and each of the latter passes through one of the turns of the brush holder spring 27. Since the turns of the latter spring are spiral the plane of the hooks 44 and 45 is practically coincident with a plane through the axis of the brush holder spring 27. Furthermore, since the loop 37 upon the buckle pin member is centrally positioned, it follows that the hook 44 which engages it lies in the same plane. Thus there is a plane at right angles to the axis of rotation of the commutator which extends through the longitudinal center of the strap 30 and lies through the axis of the buckles 35 and the springs 27 and 28. The side portions 41 of the loop member of the buckle also engage the sides of the tongues 31 when the parts are in assembled position and thus further assist in keeping the buckles centered. The transverse portion 40 being at right angles to the longitudinal axis of the buckle also contributes to the same end, as previously noted.

In operation the armature may rotate in either direction. In both, the tendency of the rotating commutator will be to drag the strap along with it. Thus, if it be assumed that the armature and commutator are moving in the direction of the arrow of Fig. 1, then tension will be placed in the upper spring 38 of that figure, while there will be little or no tension in the lower spring 38. Now, if, on the other hand, the armature be rotated in a direction opposite to the arrow in Fig. 1, then drag upon the strap 31 will put tension in the lower spring 38 of that figure and there will be little or no tension for the time being in the upper spring 38.

The pentagonal socket 46 in the outer face of the commutator is in line with the armature shaft and is provided for cooperation with a hand crank to turn the armature over by hand to throw a railway switch or other mechanism operated by the motor or for access to certain parts of the motor as the circumstances may require.

In carrying out this invention it will be clear that some changes may be made in the details of the parts without departing from the spirit and scope of the invention. I therefore aim to cover by the terms of the appended claims all of those alterations and modifications which rightly come within the spirit and scope of the invention.

I claim:
1. In combination with the frame and commutator of an electric motor, a commutator cleaner strap of flexible resilient material adapted to be wrapped about a portion of the periphery of the commutator, means carried by the frame and operative as attaching means for the opposite ends of said strap, and pulling and centering means acting between said attaching means on the one hand and the ends of said strap on the other hand to draw said strap tightly against the commutator surface and to keep said strap centered in a plane at right angles to the axis of rotation of the commutator.

2. In combination with the frame and commutator of an electric motor, a commutator cleaner strap of flexible resilient material adapted to be wrapped about a portion of the periphery of the commutator, means carried by the frame and operative as attaching means for the opposite ends of said strap, and spring and coupling means uniting the ends of said strap to said attaching means and operating to yieldingly maintain said strap in firm engagement with the commutator surface and to constantly maintain said strap in a given plane at right angles to the axis of rotation of the commutator.

3. In combination with the frame and commutator of an electric motor, a commutator cleaner strap of flexible resilient material adapted to be wrapped about a portion of the periphery of the commutator, means carried by the frame and operative as attaching means for the opposite ends of said strap, said strap having outwardly projecting tongues near its ends, buckles secured to said tongues and having in each case a bearing against the tongue throughout its full width, and coiled springs normally under tension uniting said buckles to said attaching means respectively, the axes of said strap, buckles and springs lying in a plane at right angles to the axis of rotation of the commutator.

4. In combination with the frame, brush holders and commutator of an electric motor, a strap of flexible resilient material adapted to be wrapped about a portion of the periphery of the commutator on the far side of the commutator from the brush holders of the motor, coiled springs secured to said brush holders in a plane extending through the axes of the brushes at right angles to the axis of rotation of the commutator, and buckles for connecting the free ends of said springs to the ends of said strap with a tension in said springs, said buckles each having a bearing engagement with said strap throughout a substantial portion of its width thereby to assist in maintaining said strap centered in the aforesaid plane through the brush axes.

FRANK G. SANDERS.